United States Patent [19]

Sorensen

[11] Patent Number: 4,990,299
[45] Date of Patent: Feb. 5, 1991

[54] MULTI-PARTING MOLDING SYSTEM WITH CLAMPING MEANS

[75] Inventor: Jens O. Sorensen, Rancho Santa Fe, Calif.

[73] Assignee: Primtec, Rancho Santa Fe, Calif.

[21] Appl. No.: 336,650

[22] Filed: Apr. 7, 1989

Related U.S. Application Data

[63] Continuation of Ser. No. 115,902, Nov. 2, 1987, abandoned.

[51] Int. Cl.$^5$ .............................................. B30B 7/00
[52] U.S. Cl. ........................... 264/297.4; 100/199; 100/209; 264/328.9; 425/338; 425/339
[58] Field of Search ............... 100/193, 194, 199, 204, 100/208, 209; 249/160; 264/39, 297.1, 297.4, 297.7, 297.8, 325, 328.8, 328.9, 334; 425/183, 190, 338, 339, 395, 408, 451.7, 451.9, 588, 589, 590, 595, DIG. 221

[56] References Cited

U.S. PATENT DOCUMENTS

| | | | |
|---|---|---|---|
| 2,371,061 | 3/1945 | Milano | 425/395 |
| 2,416,348 | 2/1947 | Renier | 425/DIG. 221 |
| 2,597,592 | 5/1952 | Minder | 425/395 |
| 3,809,739 | 5/1974 | Gelin | 264/325 |
| 4,146,600 | 3/1979 | Elly et al. | 264/39 |
| 4,153,405 | 5/1979 | Elly et al. | 425/339 |
| 4,364,720 | 12/1982 | Ryder | 425/595 |
| 4,376,622 | 3/1983 | Coffey | 425/451.9 |
| 4,400,341 | 8/1983 | Sorensen | 264/328.8 |
| 4,464,327 | 8/1984 | Sorensen | 264/328.8 |
| 4,738,814 | 4/1988 | Bowles et al. | 264/297.7 |
| 4,753,592 | 6/1988 | Kaaden | 264/328.8 |

FOREIGN PATENT DOCUMENTS

59-225924 12/1984 Japan ........................... 264/297.1

Primary Examiner—Jay H. Woo
Assistant Examiner—C. Scott Bushey
Attorney, Agent, or Firm—Edward W. Callan

[57] ABSTRACT

A desynchronously opened, stacked, multi-parting molding system includes left, center and right molding blocks for defining a left molding cavity between the left and center molding blocks and a right molding cavity between the center and right molding blocks; a positioning mechanism for moving the left, center and right molding blocks along a common axis with respect to each other for desynchronously opening and closing the left and right molding cavities by retracting the first means and for simultaneously clamping both molding cavities in a closed position by protracting the first means, a locking mechanism for locking one molding cavity in a closed position while both molding cavities are clamped in a closed position and for maintaining the one molding cavity in a closed position while the other molding cavity is in an open position; and a clamping mechanism within at least one of the molding blocks that define the closed cavity provides axial clamping force while the first means is retracted to open the other molding cavity to the one molding cavity that is maintained in a closed position by the second means after the other molding cavity is opened. The axial clamping force is provided by expanding the thickness of at least one of the molding blocks that defines the one molding cavity. The clamping mechanism may be such as a spring for passively providing the axial clamping force. The clamping mechanism may be controllable, such as a controllable hydraulic cylinder, for actively providing the axial clamping force.

19 Claims, 3 Drawing Sheets

MULTI-PARTING MOLDING SYSTEM WITH CLAMPING MEANS

This is a continuation of co-pending application Serial No. 07/115,902 filed on Nov. 2, 1987, now abandoned.

BACKGROUND OF THE INVENTION

The present invention pertaining to molding systems and is particularly directed to provision of clamping force in a desynchronously opened, stacked, multi-parting molding system.

A desynchronously opened, stacked, multi-parting molding system is described in U.S. Pat. No. 4,146,600 to Elly et al. The system essentially includes left, center, and right molding blocks for defining a left molding cavity between the left and center molding blocks and a right molding cavity between the center and right molding blocks along a common axis and positioning means for moving the left, center and right molding blocks with respect to each other for desynchronously opening and closing the left and right molding cavities, by retracting the first means. The positioning means also applies a clamping force to the molding cavities while both molding cavities are closed, by protracting the first means. The system further includes a locking means for maintaining one molding cavity in a closed position while the other molding cavity is in an open position so that substantial pressure can be maintained in the closed one molding cavity.

Whenever one molding cavity is opened, a clamping force is no longer applied by the positioning means to the molding cavity that remains closed. The only clamping force that is applied to the molding cavity that remains closed is whatever clamping force is applied by the locking mechanism that maintains the closed molding cavity in its closed position; and such clamping force is significantly less than that applied by the positioning means when both molding cavities are closed.

SUMMARY OF THE INVENTION

The desynchronously opened, stacked, multi-parting molding system of the present invention further includes clamping means for providing axial clamping force to one molding cavity while the one molding cavity is maintained in a closed position by the locking means, while the first means is retracted to open the other molding cavity, with said axial clamping force being provided by expanding the thickness of at least one of the molding blocks that defines the one molding cavity.

In a separate aspect of the present invention, the multi-parting molding system includes clamping means separate from the locking means for providing axial clamping force to the one molding cavity while the one molding cavity is maintained in a closed position by the locking means.

In still another aspect of the present invention, the multi-parting molding system includes clamping means within at least one of the molding blocks that define the one molding cavity for providing axial clamping force to the one molding cavity while the one molding cavity is maintained in a closed position by the locking means.

Additional features of the present invention are described with reference to the description of the preferred embodiment.

DESCRIPTION OF THE PREFERRED EMBODIMENT

Figure 1:
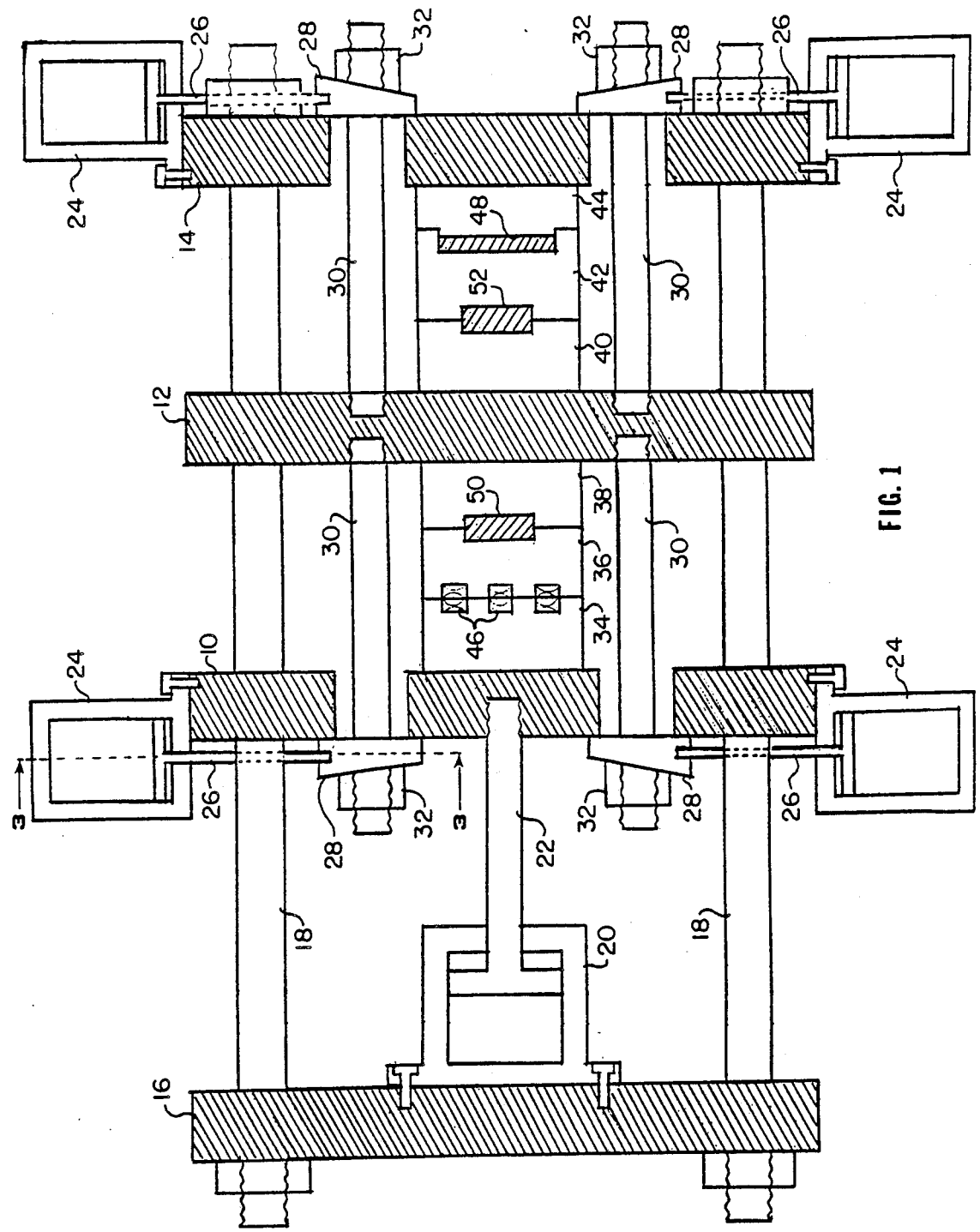
FIG. 1 is a side view illustrating a preferred embodiment of the multi-parting molding system of the present invention with both molding cavities in closed positions.
Figure 2:
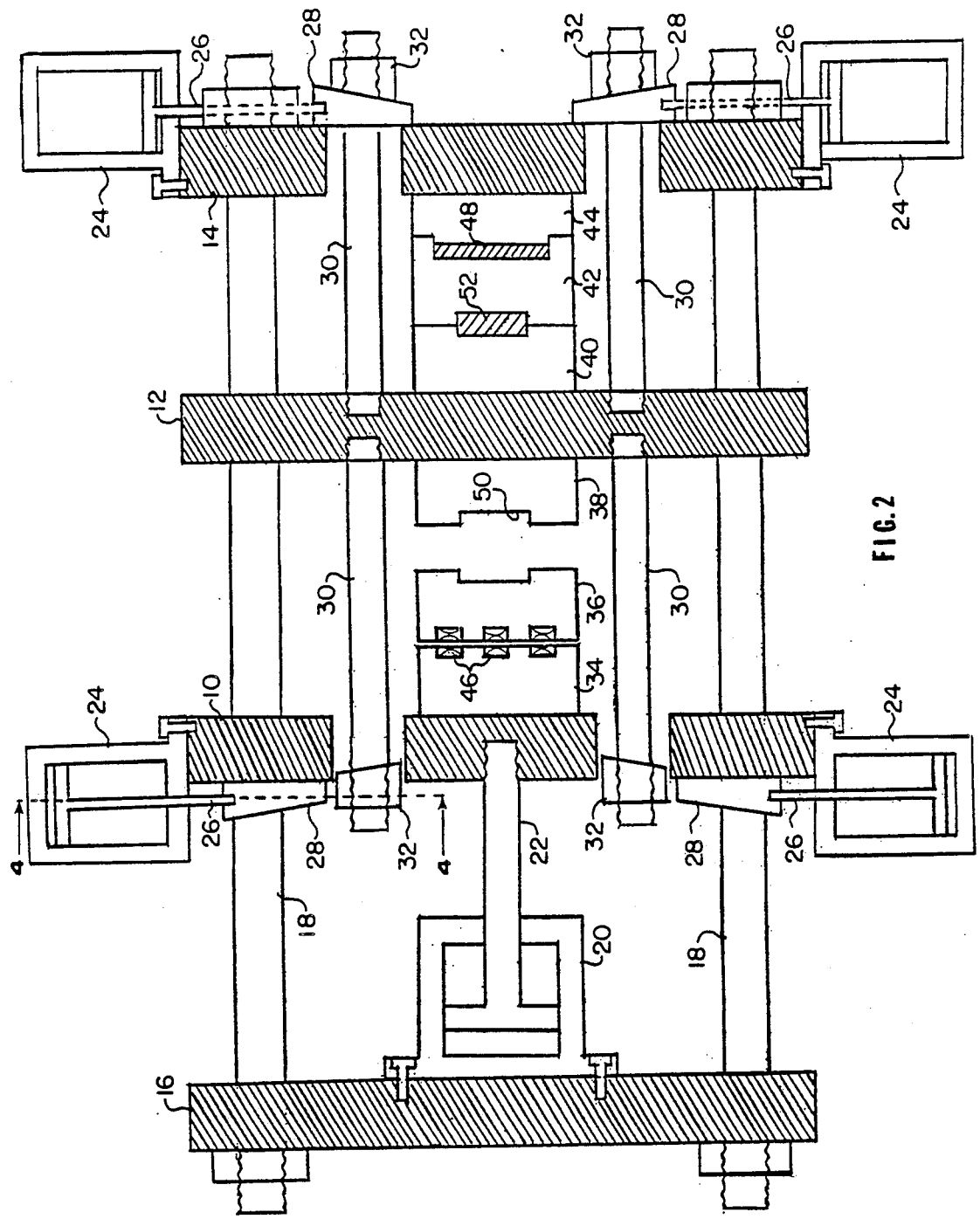
FIG. 2 is a side view illustrating the molding system of FIG. 1, with one molding cavity in an open position and the other molding cavity lock in a closed position.

Referring to FIGS. 1 and 2, a preferred embodiment of the multi-parting molding system of the present invention includes a left platen 10, a center platen 12, a right platen 14, a base block 16, positioning bars 18, and a hydraulic positioning mechanism containing a cylinder 20, a rod 22, a plurality of locking mechanisms, each including a hydraulic cylinder 24, a rod 26, a wedge-shaped locking plate 28, a locking bar 30 and a wedge-shaped nut 32; mold parts 34, 36, 38, 40, 42 and 44; a plurality of springs 46 and a hydraulic cylinder 48.

The right platen 14 and the base block 16 are stationary, and are connected by the positioning bars 18. The left and center platens 10, 12 are supported by the bars 18 between the base block 16 and the right platen 14 for lateral movement in directions toward and away from the right platen 14 and the base block 16. The cylinder 20 of the hydraulic positioning mechanism is attached to the base block 16, and the rod 22 of the hydraulic positioning mechanism is attached to the left platen 10.

For each of the plurality of locking mechanisms, the cylinder 24 is attached to the left or right platen 10 or 14, the rod 26 moves in the cylinder 24 and is connected to the locking plate 28; one end of the bar 30 is secured to the center platen 12; and the nut 32 is fastened to the other end of the bar 30. The other end of the bar 30 is threaded so that the position of the nut 32 may be adjusted.

A left molding block includes the left platen 10 and mold parts 34 and 36. A center molding block includes the center platen 12 and mold parts 38 and 40. A right molding block includes the right platen 14 and mold parts 42 and 44. A left molding cavity 50 is defined by the mold parts 36 and 38; and a right molding cavity 52 is defined by the mold parts 40 and 42.

Figure 4:
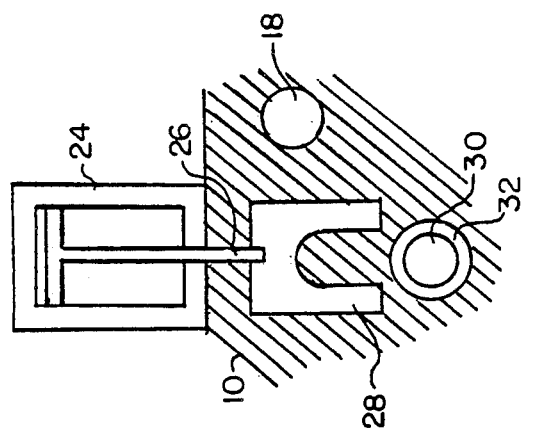
FIG. 4 is a sectional view of a portion of a locking mechanism included in the system of FIGS. 1 and 2, taken along line 4—4 of FIG. 2.
Figure 3:
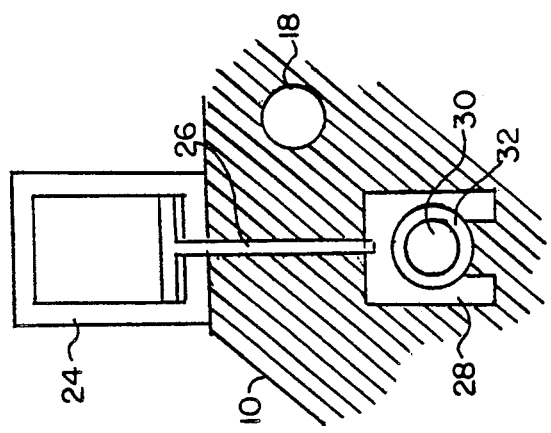
FIG. 3 is a sectional view of a portion of a locking mechanism included in the system of FIGS. 1 and 2, taken along line 3—3 of FIG. 1.

To close both the left molding cavity 50 and the right molding cavity 52, the rod 22 of the hydraulic positioning mechanism is protracted, as shown in FIG. 1. The amount of clamping force applied to the left and right mold cavities 50, 52 can be controlled by controlling the amount of protraction of the rod 22 of the hydraulic positioning mechanism. To open the molding cavities 50, 52, the hydraulic positioning mechanism is operated to retract the rod 22. When both molding cavities 50, 52 are closed the locking mechanisms are operated to lock both molding cavities 50, 52 the closed position, as shown in FIG. 1. To lock a molding cavity (for example, the left molding cavity 50) in a closed position, the rod 26 is protracted to wedge the locking plate 28 between the nut 32 and the left platen 10, as shown in FIGS. 1 and 3. To open the left molding cavity 50, the rod 26 is retracted to remove the locking plate 28 from between the nut 32 and the left platen 10, as shown in FIGS. 2 and 4.

When one of the two molding cavities 50, 52 is opened at a time when it is desired to maintain the other molding cavity in a closed position, it is necessary to lock the other molding cavity in the closed position. Thus, when the left molding cavity 50 is opened, as shown in FIG. 2, the locking mechanisms attached to the left platen 10 are operated to unlock the left platen 10 from the bars 30. The locking mechanisms attached to the right platen 14 remain in their locked position. The hydraulic positioning mechanism is then operated to retract the rod 22 and thereby move the left platen 10 to the left, which results in the opening of the left molding cavity 50. Since the locking mechanisms attached to the right platen 14 remain in their locked position, the center platen 12 remains attached to the right platen 14 and resists movement when the rod 22 is retracted to move the left platen 10 and open the left molding cavity 50. Thus the right molding cavity 52 remains closed when the left molding cavity 50 is opened. It will be readily apparent that by a reverse operation of the locking mechanisms, the left molding cavity 50 can be maintained in a locked position while the right molding cavity 52 is opened.

When the clamping force applied by the positioning mechanism 18, 20, 22 is removed from the right molding cavity 52 as a result of the retraction of the rod 22, with the right molding cavity being maintained in a closed position, as shown in FIG. 2, a substitute clamping force is applied to the right molding cavity 52 by expanding the right molding block in response to hydraulic pressure applied within the hydraulic cylinder 48 within the right molding block. The amount of the clamping force applied within the right molding block can be actively controlled by controlling the hydraulic pressure within the hydraulic cylinder 48.

When the clamping force applied by the positioning mechanism 18, 20, 22 is removed from the left molding cavity 50 as a result of the retraction of the rod 22, with the left molding cavity being maintained in a closed position (not shown), substitute clamping force is applied to the left molding cavity 50 by expanding the left molding block in response to spring pressure passively applied by the springs 46 within the left molding block. The springs 46 preferably are parabolic steel washers, which are sometimes referred to as Bellville washers. The springs 46 are compressed by the clamping force applied by the positioning mechanism when the rod 22 is protracted, and expand within the left molding block when the rod 22 is retracted.

In other preferred embodiments, both the left molding block and the right molding block will contain the same type of expanding means, whether passive expanding means, such as the springs 46, or controllable expanding means, such as the hydraulic cylinder 48.

Other variations may be made in the preferred embodiment shown herein without departing from the present invention. For example, the locking plates 28 and the nuts 32 need not be wedge shaped; the clamping means, such as the springs 46 and/or the hydraulic cylinder 48, may be located apart from rather than within the molding blocks; and each of the left and right molding blocks may be of integral construction without necessarily including platens.

We claim:

1. A method of clamping a closed molding cavity of a desynchronously opened, stacked, multi-parting molding system that includes left, center, and right molding blocks for defining a left molding cavity between the left and center molding blocks and a right molding cavity between the center and right molding blocks; first means for moving the left, center and right molding blocks along a common axis with respect to each other for desynchronously opening and closing the left and right molding cavities by retracting the first means, and for simultaneously clamping both molding cavities in a closed position by protracting the first means; and second means for locking one molding cavity in a closed position while both molding cavities are clamped in a closed position and for maintaining the one molding cavity in a closed position while the other molding cavity is in an open position, comprising the steps of
   (a) locking one molding cavity in a closed position while both molding cavities are clamped in a closed position by the first means;
   (b) maintaining the one molding cavity in a locked-closed position after the other molding cavity is opened; and
   (c) while the first means is retracted to open the other molding cavity, expanding the thickness of at least one of the molding blocks that defines the one molding cavity in order to provide axial clamping force to the one molding cavity that is maintained in a closed position by the second means after the other molding cavity is opened.

2. A method of clamping a closed molding cavity of a desynchronously opened, stacked, multi-parting molding system that includes left, center, and right molding blocks for defining a left molding cavity between the left and center molding blocks and a right molding cavity between the center and right molding blocks; first means for moving the left, center and right molding blocks along a common axis with respect to each other for desynchronously opening and closing the left and right molding cavities by retracting the first means, and for simultaneously clamping both molding cavities in a closed position by protracting the first means; and second means for locking one molding cavity in a closed position while both molding cavities are clamped in a closed position and for maintaining the one molding cavity in a closed position while the other molding cavity is in an open position, comprising the steps of
   (a) locking one molding cavity in a closed position while both molding cavities are clamped in a closed position by the first means;
   (b) maintaining the one molding cavity in a locked-closed position after the other molding cavity is opened; and
   (c) while the first means is retracted to open the other molding cavity, providing axial clamping force to the one molding cavity that is maintained in a locked-closed position by the second means after the other molding cavity is opened, by using axial clamping means that are separate and apart from the second means.

3. A method according to claim 2, characterized by step (c) comprising the step of
   (d) providing the axial clamping force by expanding the thickness of at least one of the molding blocks that defines the one molding cavity.

4. A method of clamping a closed molding cavity of a desynchronously opened, stacked, multi-parting molding system that includes left, center, and right molding blocks for defining a left molding cavity between the left and center molding blocks and a right molding cavity between the center and right molding blocks; first means for moving the left, center and right molding blocks along a common axis with respect to each other for desynchronously opening and closing the left and right molding cavities by retracting the first means, and for simultaneously clamping both molding cavities in a closed position by protracting the first means; and second means for locking one molding cavity in a closed position while both molding cavities are clamped in a closed position and for maintaining the one molding cavity in a closed position while the other molding cavity is in an open position, comprising the steps of
(a) locking one molding cavity in a closed position while both molding cavities are clamped in a closed position by the first means;
(b) maintaining the one molding cavity in a locked-closed position after the other molding cavity is opened; and
(c) while the first means is retracted to open the other molding cavity, providing axial clamping force to the one molding cavity that is maintained in a locked-closed position by the second means after the other molding cavity is opened, by using axial clamping means that are within at least one of the molding blocks that define the one molding cavity.

5. A method according to claim 4, characterized by step (c) comprising the step of
(d) providing the axial clamping force by expanding the thickness of at least one of the molding blocks that defines the one molding cavity.

6. A desynchronously opened, stacked, multi-parting molding system, comprising
left, center, and right molding blocks for defining a left molding cavity between the left and center molding blocks and a right molding cavity between the center and right molding blocks;
first means for moving the left, center and right molding blocks along a common axis with respect to each other for desynchronously opening and closing the left and right molding cavities by retracting the first means, and for simultaneously clamping both molding cavities in a closed position by protracting the first means;
second means for locking one molding cavity in a closed position while both molding cavities are clamped in a closed position and for maintaining the one molding cavity in a closed position while the other molding cavity is in an open position; and
third means for expanding the thickness of at least one of the molding blocks that defines the one molding cavity while the first means is retracted to open the other molding cavity in order to provide axial clamping force to the one molding cavity that is maintained in a closed position by the second means after the other molding cavity is opened.

7. A system according to claim 6, wherein said third means are means for passively providing said axial clamping force, such as a spring.

8. A system according to claim 6, wherein said third means are controllable means for actively providing said axial clamping force, such as a controllable hydraulic cylinder.

9. A system according to claim 6, further comprising
fourth means for locking the other molding cavity in a closed position while both molding cavities are clamped in a closed position and for maintaining the other molding cavity in a closed position while the one molding cavity is in an open position; and
fifth means for expanding the thickness of at least one of the molding blocks that defines the other molding cavity while the first means is retracted to open the one molding cavity in order to provide axial clamping force to the other molding cavity that is maintained in a closed position by the fourth means after the one molding cavity is opened.

10. A desynchronously opened, stacked, multi-parting molding system, comprising
left, center, and right molding blocks for defining a left molding cavity between the left and center molding blocks and a right molding cavity between the center and right molding blocks;
first means for moving the left, center and right molding blocks along a common axis with respect to each other for desynchronously opening and closing the left and right molding cavities by retracting the first means, and for simultaneously clamping both molding cavities in a closed position by protracting the first means;
second means for locking one molding cavity in a closed position while both molding cavities are clamped in a closed position and for maintaining the one molding cavity in a closed position while the other molding cavity is in an open position; and
third means separate and apart from the second means, and operable while the first means is retracted to open the other molding cavity for providing axial clamping force to the one molding cavity that is maintained in a locked-closed position by the second means after the other molding cavity is opened.

11. A system according to claim 10,
wherein the third means comprise means for expanding the thickness of at least one of the molding blocks that defines the one molding cavity to thereby provide said axial clamping force.

12. A system according to claim 11, wherein said third means are means for passively providing said axial clamping force, such as a spring.

13. A system according to claim 11, wherein said third means are controllable means for actively providing said axial clamping force, such as a controllable hydraulic cylinder.

14. A system according to claim 10, further comprising
fourth means for maintaining the other molding cavity in a closed position while the one molding cavity is in an open position; and
fifth means separate from the fourth means for providing axial clamping force to the other molding cavity while the other molding cavity is maintained in a closed position by the fourth means.

15. A desynchronously opened, stacked, multi-parting molding system, comprising
left, center, and right molding blocks for defining a left molding cavity between the left and center molding blocks and a right molding cavity between the center and right molding blocks;
first means for moving the left, center and right molding blocks along a common axis with respect to each other for desynchronously opening and closing the left and right molding cavities by retracting the first means, and for simultaneously clamping both molding cavities in a closed position by protracting the first means;

second means for locking one molding cavity in a closed position while both molding cavities are clamped in a closed position and for maintaining the one molding cavity in a closed position while the other molding cavity is in an open position; and third means within at least one of the molding blocks that define the one molding cavity, said third means being operable while the first means is retracted to open the other molding cavity for providing axial clamping force to the one molding cavity that is maintained in a locked-closed position by the second means after the other molding cavity is opened.

16. A system according to claim 15, wherein the third means comprise means for expanding the thickness of at least one of the molding blocks that defines the one molding cavity to thereby provide said axial clamping force.

17. A system according to claim 16, wherein said third means are means for passively providing said axial clamping force, such as a spring.

18. A system according to claim 16, wherein said third means are controllable means for actively providing said axial clamping force, such as a controllable hydraulic cylinder.

19. A system according to claim 15, further comprising fourth means for maintaining the other molding cavity in a closed position while the one molding cavity is in an open position; and fifth means within at least one of the molding blocks that define the other molding cavity for providing axial clamping force to the other molding cavity while the other molding cavity is maintained in a closed position by the fourth means.

* * * * *